May 14, 1935.  W. RABKIN  2,001,110
BULK DISPENSING DEVICE
Filed Nov. 15, 1932  6 Sheets-Sheet 1

Fig. 1.

INVENTOR
WILLIAM RABKIN.
BY
ATTORNEY

May 14, 1935. W. RABKIN 2,001,110
BULK DISPENSING DEVICE
Filed Nov. 15, 1932 6 Sheets-Sheet 2

Fig. 2.

INVENTOR
WILLIAM RABKIN.
BY
ATTORNEY

May 14, 1935.  W. RABKIN  2,001,110

BULK DISPENSING DEVICE

Filed Nov. 15, 1932  6 Sheets-Sheet 6

INVENTOR
WILLIAM RABKIN.
BY
ATTORNEY

Patented May 14, 1935

2,001,110

UNITED STATES PATENT OFFICE 2,001,110

BULK DISPENSING DEVICE

William Rabkin, New York, N. Y.

Application November 15, 1932, Serial No. 642,814

54 Claims. (Cl. 221—146)

This invention relates to bulk dispensing devices.

In particular, the invention has application for dispensing candy or similar materials, into the operation of which a feature is introduced in order to induce the sale of goods. The particular type of dispensing unit to be described has a bucket carried by a boom, the bucket being lowered into and raised from a storage of bulk material in accordance with a predetermined arrangement whereby a particular portion of the material may be separated from the storage and then discharged for delivery. However, elements of skill are introduced into the operation of certain features of mechanism in this apparatus in order thereby to hold the interest of persons who might, by such means, be induced to purchase the material in the bin.

Apparatus of this type may have combined therewith a dispensing device which, in all cases, will assure that a fixed quantity of material will be delivered regardless of the success of the operator in securing a profitable adjustment of the bucket-operating means, the skill of the operator in making such adjustment thereby enhancing the quantity delivered.

Particularly, the apparatus is designed for use with a coin-controlled mechanism which assures automatic operation of the apparatus in such manner that a single complete cycle of all the elements of the machine will occur including the final step of terminating further operation of the machine until another coin has been deposited.

It is an object of the invention to provide a dispensing apparatus of the type indicated, in which a boom carrying a bucket may preliminarily be adjusted to define the plane in which the bucket will be lowered. Simultaneously with such adjustment, there may also be accomplished the location of means to limit the position, in the particular plane to which boom and bucket have been adjusted, at which the bucket will be deposited in the material to be dispensed. If desired, an indicator may be associated with this apparatus to inform the operator at what relative point he may expect the bucket to fall within the plane to which he has adjusted the boom.

It is an object of the invention to provide a dispensing apparatus of the lift-bucket type in which the quantity discharged from the bulk storage by the bucket will be determined in accordance with the skill of the operator, while, in association with such apparatus, there will be found means for discharging, at every completed operation of the bucket, a fixed quantity either of the same or different material.

It is another object of the invention to provide, in association with a dispensing device of the character indicated, in which the bucket is of small weight and might not be effective in some of its operations by reason of that lightness, means to make the bucket positively effective at every operation.

It is an object of the invention to provide a bucket dispensing device of the character indicated in which a single power device, driving a single shaft, controls all the operations of the machine by means of cables extended to the several parts and actuated by cams on that single shaft.

Other objects of this invention will be set forth hereinafter, or will be apparent from the description and the drawings in which is illustrated an embodiment carrying out the invention.

The invention, however, is not intended to be restricted to any particular construction or arrangement of parts, nor to any particular application of such construction, nor to any of the various details thereof herein shown and described, as the same may be modified in various particulars or to be applied in many varied relations without departing from the spirit and scope of the claimed invention, the practical embodiment herein illustrated and described being merely one of various forms and modifications in which the invention might be embodied.

On the drawings, in which the same reference characters refer to the same parts throughout, and in which is shown a preferred embodiment:

Fig. 2 is a vertical sectional view, on the line 2—2 of Fig. 1, portions being broken away to disclose the boom construction;

Figure 1:
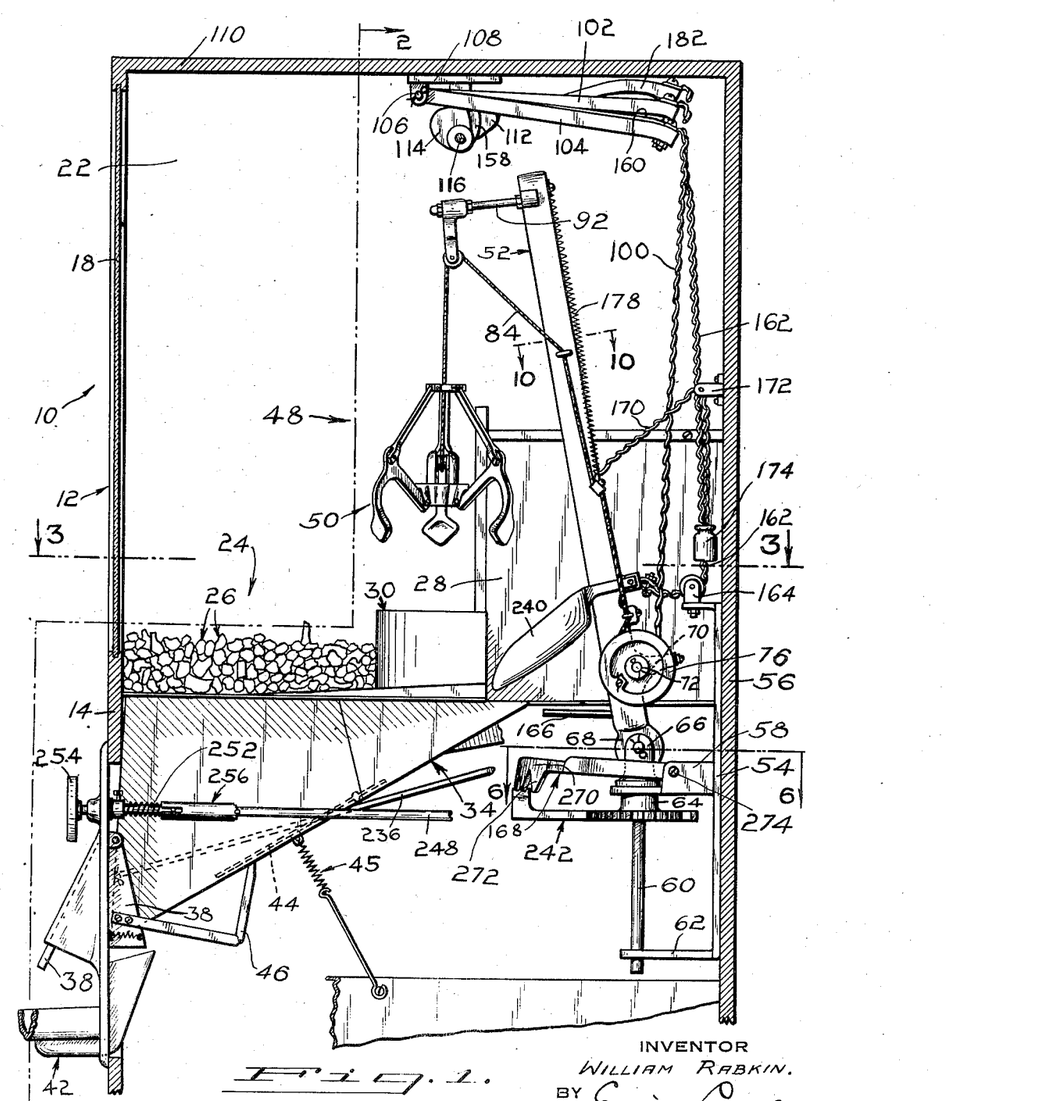
Fig. 1 is an elevational view of a dispensing apparatus embodying the invention, the cabinet being broken away in section, and other portions of the apparatus being broken away to disclose the relative arrangement of the parts.
Figure 3:
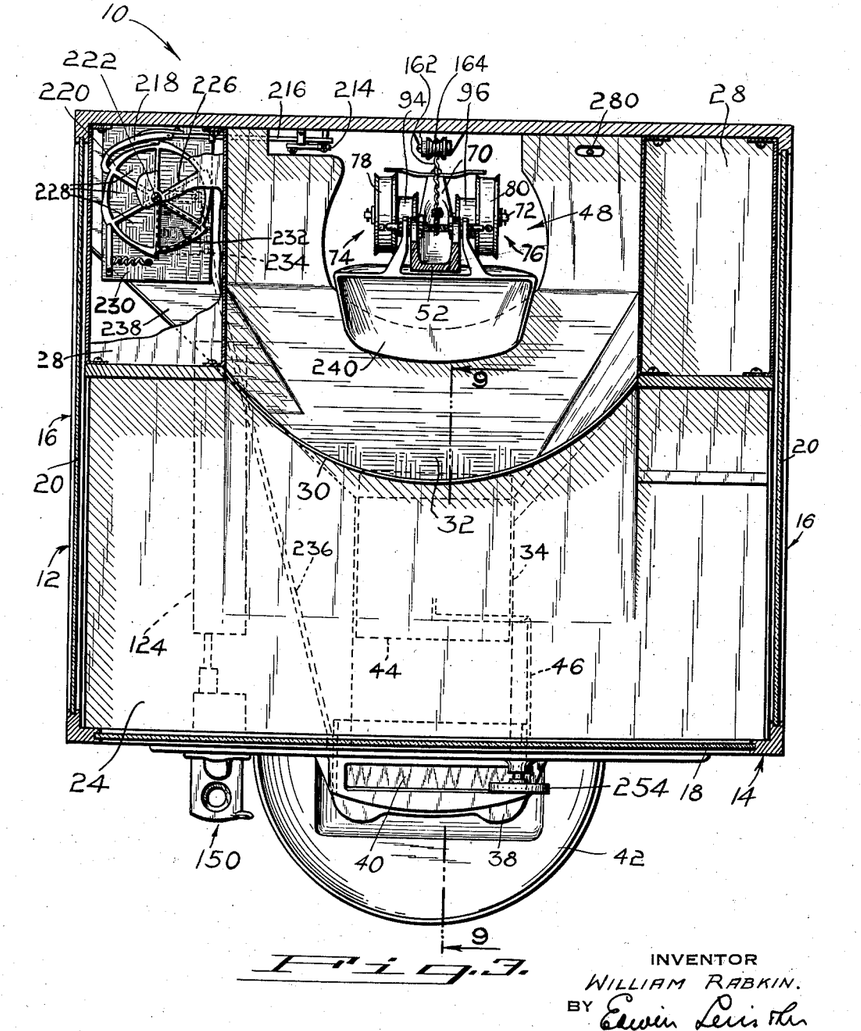
Fig. 3 is a transverse cross-sectional view, on the line 3—3 of Fig. 1, the bulk material having been removed from the bin.
Figure 4:
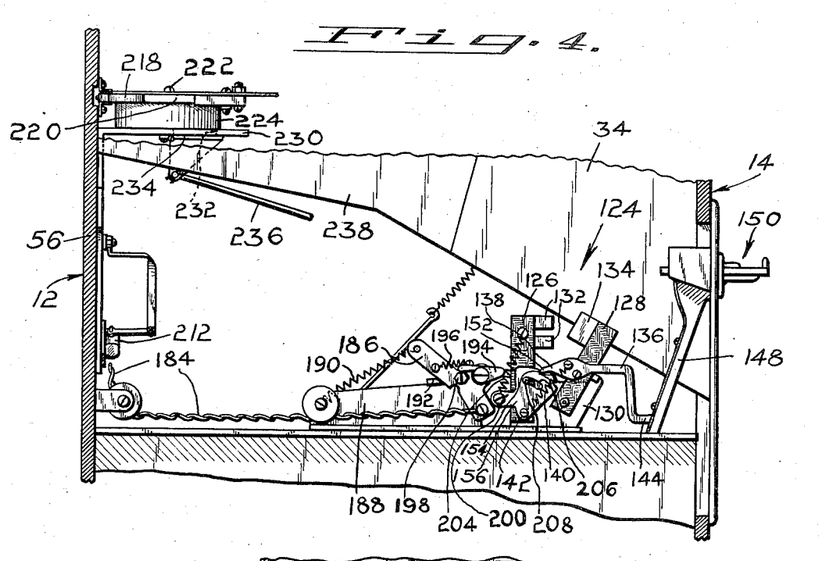
Fig. 4 is a detail elevational view from the side of the structure at the left side in Fig. 2, a portion of the cabinet and certain of the elements being broken away to make clearly apparent apparatus located at that end.
Figure 5:
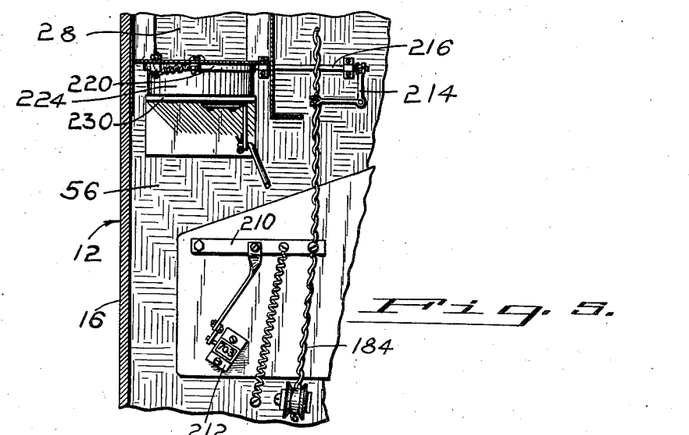
Fig. 5 is an elevational view of the apparatus shown in Fig. 4, and positioned on the back wall, as seen from a plane transversely of the cabinet in Fig. 4.
Figure 6:
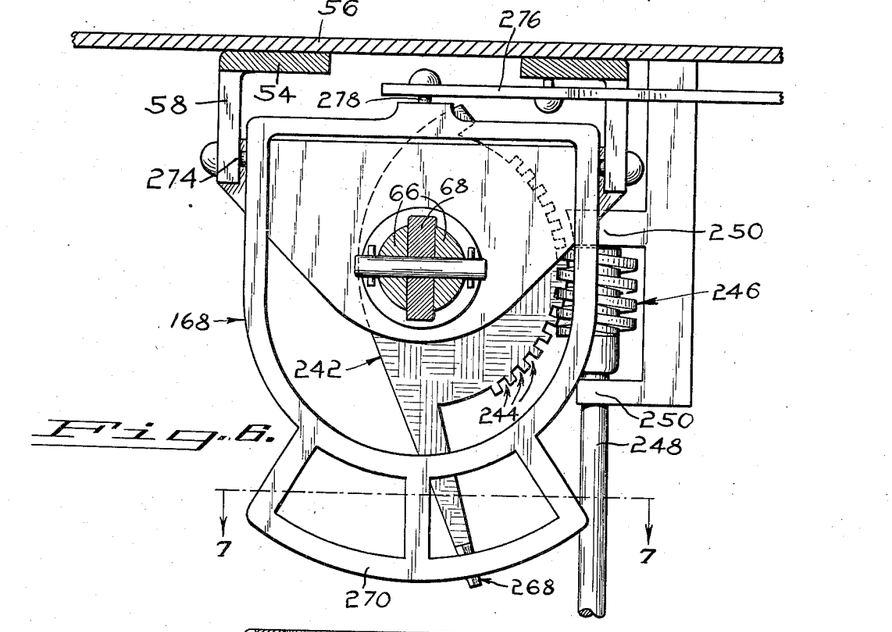
Fig. 6 is a transverse cross-sectional view, on the line 6—6 of Fig. 1, illustrating the adjusting mechanism.
Figures 7, 8:
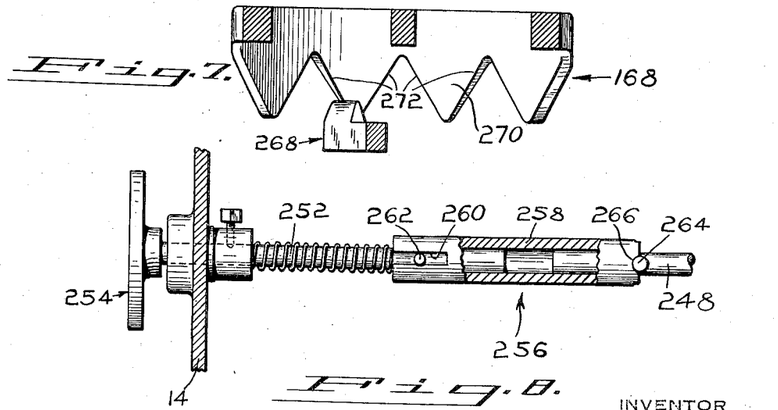
Fig. 7 is a vertical cross-sectional view, on the line 7—7 of Fig. 6, illustrating the construction of details of the adjusting mechanism.
Fig. 8 is an elevational view, partially broken away in section, illustrating the construction of the manually operated means for the adjusting mechanism.
Figure 8:
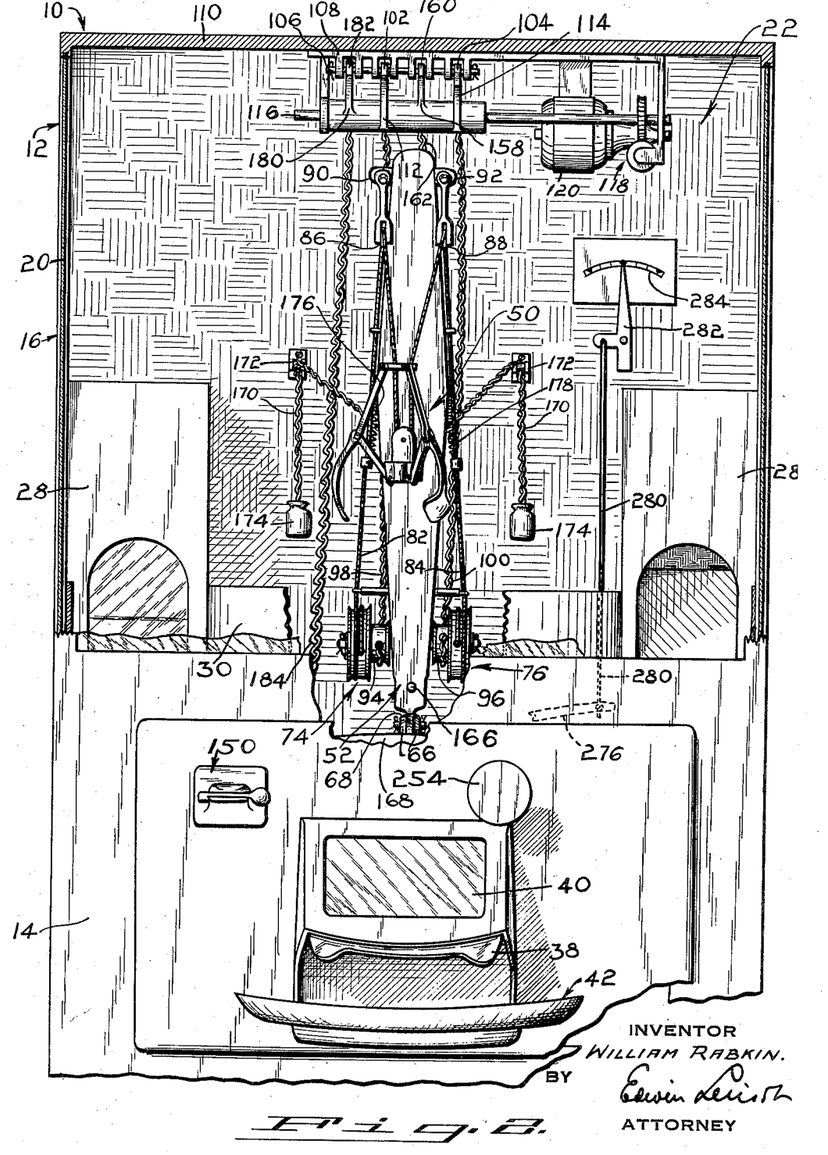
Figure 9:
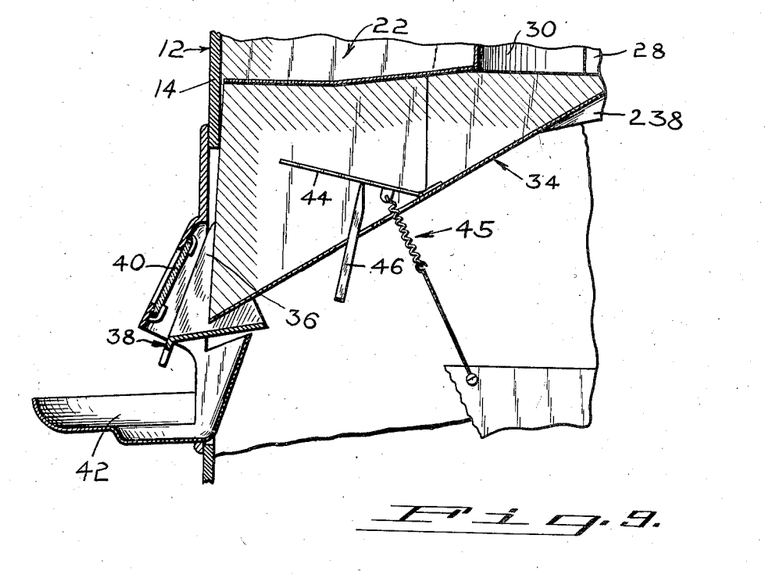
Fig. 9 is a vertical cross-sectional view, on the line 9—9 of Fig. 3, portions of the apparatus being shown in elevation, and the construction of the vibrating bottom for the chute being illustrated.
Figure 10:
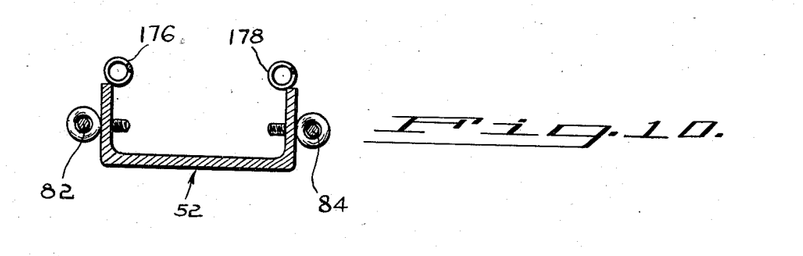
Fig. 10 is a transverse cross-sectional view, on the line 10—10 of Fig. 1.

The dispensing machine 10, shown on the drawings, may be encased in a cabinet 12, in this case having in the front wall 14 and side wall 16, panels 18 and 20 of glass, in order that chamber 22 may be visible to an operator standing before the apparatus. The chamber, at its bottom, is formed as a container or bin 24, for the reception of material 26. Separate and auxiliary containers 28 may be aranged at the sides of bin 24 for ornamental purposes, and also as additional storage means from which material therein contained may discharge by gravity into container 24, as material in container 24 is exhausted. The bottom of the container 24 may, if desired, be defined by sloping walls, the tendency of which would be to gravitate material contained therein to a common location.

The rear boundary of container 24 may be defined by a semi-circular wall 30 behind which opens the mouth 32 of chute 34, the chute leading downwardly beneath container 24 to a discharge opening 36 in front wall 14. This opening may be governed by a suitable valve 38 pivoted adjacent to and cooperating with a transparent wall 40. By pushing inwardly upon the valve and pivoting it away from wall 40, there will be delivered, either to the hand of the operator or upon a receptacle 42, such material as may have been deposited in the chute. As a part of the bottom of the chute, a plate 44 may be arranged, the plate, by means of a spring 45 being pressed against a rod 46 to provide a movable wall, the other end of the rod being secured to valve 38. When valve 38 is rocked inwardly away from discharge opening 36, such material as may have been deposited in chute 34, and may not have slid down against wall 40, will be agitated sufficiently to cause it to slide down the chute and discharge. Also, plate 44, so rocked, will prevent the insertion of the hand or a tool any distance up through the chute.

Disposed to the rear of wall 30 is charge-forming apparatus 48. This apparatus includes a bucket 50, a boom 52 carrying the bucket, and mechanism for locating the boom and the bucket in the manner to be indicated. The boom, made of metal for purposes of strength and rigidity in operation, is carried from a frame 54 secured to the back wall 56 of the cabinet. This frame preferably has extending forwardly therefrom a bracket 58 through which is extended a shaft 60, the lower end of this shaft being guided through another bracket 62. Above bracket 58 the shaft has attached thereto a collar 64 having a bifurcated extension defining a pair of bearing lugs 66 between which is received the bearing end lug 68 of boom 52. By means of a pin extended through openings in the several lugs, which openings are aligned for that purpose, the boom is pivoted so that it may move transversely of the material in bin 24 in a plane through the axis of shaft 60.

The boom is provided, adjacent bearing lug 68, with bearings 70 for a shaft 72. On this shaft are rotatably mounted, on each side of the center of the boom, compound pulleys or drums 74 and 76, each of which consists of sections of larger and smaller effective diameters. Affixed to the larger sections 78 and 80 are the ends of cables 82 and 84, which are then wrapped around their drums. The cables extend upwardly along the boom, away from their drums, and over pulleys 86 and 88, carried in spaced relation to the boom on extensions 90 and 92 located adjacent the upper end of the boom. The cables extend downwardly to bucket 50 held dependent on cable 82.

Affixed to the smaller sections 94 and 96 are the ends of chains 98 and 100, so that the chains may be wound on the drums. These chains extend upwardly away from their drums to be attached to the ends of levers 102 and 104, pivotally supported, at their ends, upon a common rod 106 carried by a bracket member 108 secured to the top 110 of the cabinet. These levers extend across, and, by gravity, are caused to remain in contact with respective cams 112 and 114 fixed to a common shaft 116 which is provided with bearings in bracket member 108. One end of the shaft, by means of a worm and worm wheel arrangement 118, is driven from a motor 120.

Power for the motor is derived from wires, one of which has a switch 124 interposed therein. This switch consists of a stationary arm 126 and an arm 128 pivoted for movement with relation thereto. Both arms are secured to a common upright 130; arm 126 carries, adjacent its end, a pair of metallic prongs 132, while arm 128, in substantially a similar position, carries a single blade 134. The arms themselves may be of insulating material, or may otherwise be constructed to completely insulate the prongs and plate from the upright and from each other. When arm 128 is moved toward arm 126, its blade 134 will be inserted between prongs 132. If proper connections are made to prongs and blade, this insertion of the blade may be used to complete a circuit.

Carried pivotally by arm 128 is a Z-shaped lever 136. One of the legs 138 of this lever has secured thereto the end of a spring 140, the other end of the spring being secured to a fixed point 142 on arm 126. Spring 140 normally tends to extend the other leg 144 of lever 136 through a slot in a coin chute 148. Coins, deposited at a proper slide 150, arranged and constructed to receive the coin intended to operate the apparatus, and to discard all other coins, descend through the chute and strike against leg 144. Spring 140 is light enough so that the impact of the coin against leg 144 will cause the free end 152 of leg 138 to disengage from a shoulder 154 on plate 156, the latter being pivoted to arm 126 at point 142. Release of end 152 from this engagement frees arm 128 for movement about its pivot under the action of spring 140, whereby blade 134 is automatically brought into engagement with prongs 132 and the necessary current for the operation of motor 120 supplied.

Shaft 116 is now caused to rotate, carrying with it, in addition to the previously mentioned cams, another cam 158 on the shaft against which, in a manner similar to the other levers, a lever 160, also carried by rod 106, continuously engages. A chain 162, secured at its end to lever 160, extends down around an idler pulley 164, carried by frame 54, and is extended to and secured at the rear face of the boom. Cam 158 is so designed that first lever 160 will be lowered, permitting the boom to move forwardly and arrange the bucket immediately over bin 24. Forward movement of the boom about its pivot will be limited by the engagement of a forwardly extending pin 166 with an adjustable limiting member 168 so that continued rotation of the shaft and release of chain 162 will not release the boom for further lowering movement. Apparatus to be described hereafter will point out the manner in which member 168 may be adjusted to establish different limits for this forward movement of the boom. A pair of chains 170 may be secured at their ends to the boom and then directed rearwardly over a pair of pulleys 172, mounted on back wall 56. Depending from the ends of these chains are weights 174 for the purpose of counterbalancing the boom during the operation of the apparatus.

Movement of shaft 116 may, at this stage, have caused lowering of lever 102, and through the chain attached to that lever, the release of cable 82. This cable lifts and lowers the bucket. Since, for the purposes for which apparatus of this type would normally be used, cables of substantially light weight are to be used, there might arise the tendency, as the pulleys or drums, upon which they are wound, rotate, to snap the cables and cause them to jump off from their drums. To prevent this, the portion of the cable wound around the drum will be continuously and sharply retained in tension by a spring 176. This spring is engaged with cable 82 at any desired point, being anchored to the boom to exert its tension to draw cable 82 upwardly along the boom off the drum to unwind it from its section 78 and to wind the chain on its section 94. After lever 102 has operated in this manner to lower the bucket completely into the material in bin 24, lever 104 is engaged and lifted by its cam so that its attached chain will rotate its drum to cause cable 84 to be wound on the drum, against the action of a spring 178 similar in arrangement to spring 176 in such manner that the bucket, in this case of the orange peel variety, will be closed and thereby separate a charge.

Continued upward movement of lever 104 would now cause cable 84 to lift the bucket. Lever 102, at this time, also is lifted substantially at the same rate as lever 104 to draw its cable 82 upwardly. The two cables are thus wound up practically at the same speed so that the charge will not be lost as the bucket rises. At any point after the bucket has been raised to a point above the material where it can clear wall 30, lever 160 may be engaged by its cam so that, through chain 162, the boom will be drawn rearwardly to bring the bucket over wall 30 and over mouth 32.

Practically with the first movement of shaft 116, another cam 180 carried by the shaft and in engagement with a lever 182, will have permitted that lever to drop, releasing a chain 184 attached at its end to and depending from lever 182. An arm 186, carried by upright 188, has one end of a coiled spring 190 affixed to it, the other end of the spring being anchored to the upright and acting to drive the arm up against a stop 192 which may be made a part of the upright. To one end of the arm, chain 184 is secured to pull the arm and cause it to pivot against the force of spring 190. Adjacent the other end of the arm is pivotally secured a finger 194, which, by a spring 196, is brought to bear against the pivot pin 198 of the arm which thus serves additionally as a stop. As the chain is released by lever 182, finger 194 passes by an extension 200 on plate 156, pivoting, without affecting any relationship of parts, but being returned by the action of spring 196 against its stop 198 after the passage has been completed.

When the boom is being raised to the position where the bucket will be over discharge chute 34, cam 180 has again become effective, through its lever 182, to pull upon chain 184, thereby forcing arm 186 to move against the action of spring 190. Continued pivoting of the arm will finally bring finger 194 into engagement with extension 200. Before this can occur or practically simultaneously therewith, cam 114 will release lever 104, permitting cable 84 to be drawn upwardly by its spring. The bucket will thus open, whereupon the trapped charge will be discharged through the discharge chute. Finger 194 will, by this time, have engaged extension 200, pivoting plate 156 to bring shoulder 154 into position beneath end 152, which will fall into position in abutment with the shoulder. Finger 194 will move past extension 200, releasing the plate to move around its pivot under the action of a spring 204, secured both to the extension and to arm 126. The plate will be driven so that lever 136 and its secured arm 128 will be shoved away from arm 126 to break the circuit. A slot 206, in plate 156, and a pin 208 secured to arm 126 and extending through the slot, may serve to limit movement of the plate under the action of spring 126.

While complete automatic operation is attained in this case by means of electric motor operation, it is to be understood that hand operation or operation by some other power source may be applied in which the dropping of the coin would serve to couple a drive shaft for the apparatus, or release such other power means, the action of chain 184 being thereafter relied upon, in all cases, either to uncouple the shaft or to make the other power means inoperative.

It may also be noted that the action of lever 104 to permit opening of the bucket may be delayed until slightly before, immediately at, or even slightly after, the time at which finger 194 trips over extension 200, since the moving parts of the apparatus will have sufficient momentum to effectuate that result even after the circuit of the motor has been broken.

In order to count the number of charges dispensed by the machine or the number of complete cycles during which the machine is made to function, an arm 210 may be pivoted upon the frame. The end of this arm is engaged by chain 184 so that, as the chain makes each complete movement, upwardly and downwardly, for each complete cycle of the machine, arm 210 will be rocked through one complete oscillation thus to operate a counter 212.

Likewise, the movement of this chain may be caused to actuate a bell-crank 214 which has loose engagement with the end of a slide rod 216. This rod, retained and moved through suitable guides, reciprocates a pawl 218, spring-pressed against a ratchet wheel 220. The ratchet wheel is secured to a shaft 222, upon which is also secured a wheel 224 which may rotate beneath one of the storage containers 28 or some other suitably arranged container. An opening 226 in the bottom of this container communicates successively with chambers 228, which are formed as radial compartments in wheel 224, discharging material into these compartments. Therefore, as wheel 224 rotates, each chamber will receive a definite charge of material, and upon rotation to a properly arranged discharge opening, will be enabled to deliver a definite charge.

Beneath wheel 224 is disposed a solid wall 230 having an opening 232 displaced radially at least the distance equal to the spacing of adjacent chambers from registration or alignment with opening 226. A plate 234 may be arranged to pivot with relation to wall 230, moving toward and being able to close opening 232. A link 236, connected to plate 234, controls movement of the plate with relation to the opening, controlling discharge of material from a chamber 228, disposed immediately above opening 232, down a chute 238, which, in this instance, is directly connected with chute 34. Link 236 may be connected with valve 38 so that, simultaneously with opening of the valve and clearing the chute of material dumped by the bucket, material from a chamber 228 may likewise be discharged. A chamber 228, filled with material, preferably will not be disposed over opening 232 until a coin has properly been deposited and the machine placed in operation. If desired, plate 234 and its accompanying mechanism may be dispensed with, the discharge into chute 238 occurring automatically as the apparatus continues in its operation.

Arranged on the boom and preferably pivotally secured thereto, is a dash pan 240. Since the rear end of the discharge chute 34 must be cut away to permit the extension of the boom and its associated elements above the plane of container 24, the rear edge of the discharge chute may be at an elevation such that material discharged by the bucket might fall over moving parts of the apparatus. This dash pan, which continuously follows the movement of the boom and the associated bucket, assures that discharged material will, in all cases, fall into the discharge chute.

Secured to shaft 60, and in the case shown, beneath bracket 58, is a sector 242 formed with worm teeth 244 for engagement by a worm 246. This worm is mounted on a shaft 248 carried in bearings 250, made a part of the frame. The shaft extends forwardly and is engaged by another shaft 252 which extends through front wall 14. At this point it is provided with a handle 254 to permit rotation of the shafts. Shafts 248 and 252 are connected by a releasible coupling 256, in this case consisting of a spring-pressed collar 258 having a slot 260 at one end, into which a pin 262 on shaft 252 is forced. A pin 264 on shaft 248 likewise is pressed, by the action of the same spring, against any one of a number of slight depressions 266 at the other end of the collar. Ordinary forces may be transmitted through the engagement of pin 264 and depressions 266. When, however, the forces are increased sufficiently, as where an end point is reached and one of the end stops prevents further rotation of shaft 248, and extraordinary force may unwarrantedly be applied to handle 254, pin 264 will automatically cam out of its engagement with the depression, permitting continued rotation of shaft 252 without affecting shaft 248 and, of course, without the danger of destruction of any of the parts associated therewith. In this manner, shaft 60 may be rotated to position the boom in any desired plane through the axis of rotation of the shaft.

Formed as an extension from sector 242 is a tooth 268. Member 168 has a downwardly extending wall 270 in which are formed a plurality of teeth 272, this wall, at the teeth, resting upon tooth 268. Member 168 is pivoted to the frame at 274 in suitable bearings therefor provided, so that it will be permitted vertical movement as tooth 268 moves beneath wall 270. Engagement of tooth 268 and teeth 272, as the sector is rotated, will cause camming of wall 270 vertically, and thus function to dispose the top surface of the member at different levels. In this manner, the level at which pin 166 will be stopped is changed for each position to which sector 242 is adjusted.

Pivotally mounted on the frame is an arm 276, one end of which is engaged by a pin 278 on member 168. The other end of the arm engages a link 280 extending upwardly to engage a pivoted pointer 282. This pointer is pivotally mounted so that its end will vibrate across a dial 284, whereupon indications will note the final relationship of the bucket to the charge, that is, where the bucket will finally be positioned, forwardly, rearwardly, or centrally, of the material in the bin.

Many changes could be effected in the particular machine designed, and in the manner of use set forth and in specific details thereof without substantially departing from the invention defined in the claims, the specific description herein being merely to illustrate an operative embodiment for carrying out the spirit of the invention.

What is claimed as new and useful is:—

1. In bulk dispensing apparatus for discharging from a storage a quantity of bulk material contained in the storage, means for separating a charge of material from the mass in storage, a boom for carrying the separating means, and means for swinging the boom for determining the point in the mass where the separating means will become effective, the boom swinging means including means for predetermining an actual point laterally and longitudinally of the storage mass at which the separating means will become effective.

2. In bulk dispensing apparatus for discharging from a storage a quantity of bulk material contained in the storage, means for separating a charge of material from the mass in storage, a boom for carrying the separating means, and means for swinging the boom laterally for fixing the point in the mass where the separating means will become effective, the boom swinging means including means for predetermining an actual point transversely of the line of swing of the boom where the separating means will become effective.

3. In bulk dispensing apparatus for discharging from a storage a quantity of bulk material contained in the storage, means for separating a charge of material from the mass in storage, a pivoted boom for carrying the separating means, and means for swinging the boom in a direction other than around its pivot for fixing the point in the mass where the separating means will become effective, the boom swinging means including means for limiting movement of the boom about its pivot.

4. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, the boom being mounted to be swung transversely of the mass in two directions, means for swinging the boom in one direction, and means cooperating with the swinging means to limit the swing of the boom in the other direction.

5. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, the boom being mounted to be swung transversely of the mass in two directions transversely of each other, means for swinging the boom in one direction, and means cooperating with the swinging means to limit the swing of the boom in the other direction.

6. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, the boom being mounted to be swung transversely of the mass in two directions, means for swinging the boom in one direction, and means adjusted upon operation of the swinging means to limit the swing of the boom in the other direction.

7. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, the boom being mounted to be swung around a vertical axis and also in a vertical plane, means for swinging the boom in one of the two directions of swing, and means cooperating with the swinging means to limit the swing of the boom in the other direction.

8. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, the boom being mounted to be swung around a vertical axis and also in a vetrical plane, means for swinging the boom around the vertical axis, and means adjusted upon operation of the swinging means to limit the swing of the boom in the vertical plane.

9. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing transversely of the direction in which it is moved by the carriage, means for swinging the carriage on its axis, and means adjusted upon operation of the swinging means to limit the swing of the boom in the transverse direction, the limiting means being adjusted to varying positions while the swinging means remains approximately at the same location.

10. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing in a substantially vertical plane, a cam carried by the swinging means, and means cooperating with the cam to set the limit of swing of the boom in the vertical plane, the position of the limiting means being varied as the position of the swinging means changes.

11. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing in a substantially vertical plane, a cam carried by the swinging means, and a plate resting upon the cam to set the limit of swing of the boom in the vertical plane, the position of the plate being different for each position of the swinging means.

12. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing in a substantially vertical plane, a cam carried by the swinging means, and a toothed member resting upon the cam to set the limit of swing of the boom in the vertical plane, the position of the member being determined by the position of the swinging means.

13. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing in a substantially vertical plane, a cam carried by the swinging means, a toothed member resting upon the cam so that its teeth cooperate with the cam, movement of the swinging means causing vibration of the member vertically to set the limit of swing of the boom in the verticle plane, the member attaining varied vertical positions while the swinging means remains approximately in the same position and a stop pin carried by the boom for cooperation with the top surface of the member to limit movement of the boom in a vertical plane.

14. In bulk material dispensing apparatus comprising a storage bin, a bucket for separating a charge from material contained in the bin, a charge forming member associated with the bin and receiving material therefrom, means for making the bucket effective to separate a charge from the material in the bin, a discharge outlet from the apparatus to receive the charge from the bucket, and means for making the charge forming member effective to discharge a formed charge from the bin when the bucket is made effective to separate a charge.

15. In a dispensing apparatus for separating, from a heap of bulk material, a charge of such material to be discharged from the apparatus, comprising a storage bin, a discharge chute beneath the bin and opening to the rear of one wall of the bin, a boom mounted to the rear of the open end of the chute, the boom carrying means for insertion into the bin for separating a charge from the material in the bin, means for moving the boom to convey the separated charge from the bin over the walls thereof and then to discharge such charge into the chute, and a deflector plate carried by the boom for guiding into the chute material discharged by the separating means.

16. In a dispensing apparatus for separating from a mass of bulk material a charge of such material and for delivering such charge, comprising a storage bin, a bucket for insertion into the bin, a boom for locating and supporting the bucket in its various operations, a pair of cables passed over the boom and having engagement with the bucket, one of the cables operating opening and closing mechanism for the bucket, and the other cable operating to lift and drop the bucket, and spring members engaging the cables for placing portions thereof continuously in tension.

17. In a dispensing apparatus for separating from a mass of bulk material a charge of such material and for delivering such charge, comprising a storage bin, a bucket for insertion into the bin, a boom for locating and supporting the bucket in its various operations, manipulating means for the bucket including means for lowering and raising the bucket, and means for closing and opening the bucket, single power means for the bucket manipulating means, and means for limiting the operation of the power means to effectuate one complete cycle of opening and closing, and of lowering and raising the bucket, said limiting means including a knife switch consisting of a pronged member and a blade member pivotally related, a finger carried by one of the members, a cam carried by the other member, spring means for driving the cam into a normal position, means for pressing the finger against the cam, means on the cam for engaging the finger, and means for moving the cam to make the engaging means effective so that when the cam is released, the cam will drive the finger to separate the members.

18. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing in a substantially vertical plane, a cam carried by the swinging means, a toothed member resting upon the cam so that its teeth cooperate with the cam, movement of the swinging means causing vibration of the member vertically to set the limit of swing of the boom in the vertical plane, the member attaining varied vertical positions while the swinging means remains approximately in the same position, a stop pin carried by the boom for cooperation with the top surface of the member to limit movement of the boom in a vertical plane, and an indicator related to the swinging means to indicate the effective final relation of the bucket to the plane into which it will be adjusted.

19. In bulk dispensing apparatus for discharging from a storage a quantity of the bulk material contained in the storage, a bucket for segregating a charge of bulk material from the mass in storage, a boom for supporting the bucket, means associated with the boom and the bucket for lifting, lowering and dumping the bucket, a carriage for the boom, the carriage having an axis disposed substantially vertically, the boom being pivotally mounted on the carriage to swing in a substantially vertical plane, a cam carried by the swinging means, a toothed member resting upon the cam so that its teeth cooperate with the cam, movement of the swinging means causing vibration of the member vertically to set the limit of swing of the boom in the vertical plane, the member attaining varied positions while the swinging means remains approximately in the same position, a stop pin carried by the boom for cooperation with the top surface of the member to limit movement of the boom in a vertical plane, a shaft for effecting adjustment of the boom swinging means, and a spring-pressed coupling intermediately of the shaft.

20. In bulk material dispensing apparatus including a storage bin for the material, a discharge chute for the material, a bucket for separating a charge of the material, a boom for supporting and manipulating the bucket, a shaft, a plurality of cam members carried by the shaft, a plurality of arms actuated by said cam members, cable members dependent from said cam members, the cam members and the cable members being related so that the boom will be permitted to lower toward the bin, the bucket will be lowered, then closed, then lifted, the boom raised away from the bin, and then the bucket opened, a predetermined bulk dispensing member fed from the bin, and means actuated by one of the chains to discharge a predetermined amount of the material into the chute.

21. In apparatus for dispensing material in bulk, the apparatus including a storage for the bulk material; means for separating charges from the bulk material in storage, the separating means including a charge-separating element, and means for locating the charge-separating element to be effective in relation to a limited portion of the stored material to separate a charge at such portion; means for limiting the locating means to make the separating element effective at a specific point in the limited portion of the stored material; and a single manipulator for the locating means and limiting means.

22. In apparatus for dispensing material in bulk, the apparatus including a storage for the bulk material; means for separating charges from the bulk material in storage, the separating means including a charge-separating element, and means for locating the charge-separating element to be effective in relation to a limited portion of the stored material to separate a charge at such portion; means for cooperating with the locating means to predetermine a specific point in the limited portion of the stored material; the charge-separating element moving within a plane from the point of separation of the charge from the stored material to the point at which the material is discharged from the element; and a single manipulator for the locating means and the controlling means.

23. In apparatus for dispensing material in bulk, the apparatus including a storage for the bulk material; means for separating charges from the bulk material in storage, the separating means including a charge-separating element, and means for manually locating the charge-separating element to be effective in relation to a limited portion of the stored material to separate a charge at such portion; and manually operated means for limiting the locating means to make the separating element effective at a specific point in the limited portion of the stored material; the charge-separating element moving within a plane from the point of separation of the charge from the stored material to the point at which the material is discharged from the element.

24. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of arms cooperating with the shaft, and means actuated by the arms for making the charge-separating device effective to separate a charge from the storage.

25. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of arms cooperating with the shaft, and means actuated by the arms for moving the charge-separating device to a position over the storage.

26. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of arms cooperating with the shaft, and means actuated by the arms for moving the charge-separating device to the charge-receiving element after the charge-separating device has been effective to separate a charge from the storage.

27. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, means for rotating the shaft, a plurality of arms cooperating with the shaft, and means actuated by the arms for making the rotating means ineffective.

28. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of arms cooperating with the shaft, and means actuated by the arms for moving the charge-separating device to a position over the storage and for then making it effective to separate a charge from the storage.

29. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of arms cooperating with the shaft, and means actuated by the arms for moving the charge-separating device to a position over the storage, for then making it effective to separate a charge from the storage, and for thereafter moving it to position over the charge-receiving element.

30. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, means for rotating the shaft, a plurality of arms cooperating with the shaft, and means actuated by the arms for moving the charge-separating device to a position over the storage, for then making it effective to separate a charge from the storage, for thereafter moving it to position over the charge-receiving element, and thereupon making the rotating means ineffective.

31. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of cams carried by the shaft, and means actuated by the cams for moving the charge-separating device to a position over the storage, for then making it effective to separate a charge from the storage, and for thereafter moving it to position over the charge-receiving element.

32. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of cams carried by the shaft, arms cooperating with the cams, and means actuated by the arms for making the charge-separating device effective to separate a charge from the storage.

33. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of cams carried by the shaft, arms cooperating with the cams, and flexible members actuated by the arms for making the charge-separating device effective to separate a charge from the storage.

34. In a bulk-dispensing device comprising, in combination, a storage, a charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of cams carried by the shaft, arms cooperating with the cams, and flexible members connected to the arms for making the charge-separating device effective to separate a charge from the storage.

35. In a bulk-dispensing device comprising, in combination, a storage, a charge-separating device, a boom for the charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of arms cooperating with the shaft, and means actuated by the arms for moving the boom to position the charge-separating device at a position over a point in the storage.

36. In a bulk-dispensing device comprising, in combination, a storage, a charge-separating device, a boom for the charge-separating device, a charge-receiving element, and means for making the charge-separating device effective for separating a charge from the storage conveying it to the charge-receiving element and discharging it into the charge-receiving element; the means including a single shaft for effecting the various operations of the charge-separating device, a plurality of cams carried by the shaft, arms cooperating with the cams, and flexible members connected to the arms and to the boom.

37. In a bulk-dispensing device comprising, in combination, a storage, a charge-separating device, a boom, cable mounting for the charge-separating device, a charge-receiving element, and means for making the charge-separating device effective for separating a charge from the storage, conveying it to the charge-receiving element and discharging it into the charge-receiving element; the means including a single shaft for effecting the various operations of the charge-separating device, a plurality of cams carried by the shaft, arms cooperating with the cams, and flexible members connected to the arms, the boom and the cable mounting.

38. In an amusement device for testing the skill of an operator; a storage for a mass of bulk material; and a grab device, the grab device including a grab element, means for supporting the grab element, the supporting means, when the amusement device is not in operation, being adjustable to position the grab element in substantially any plane transversely of the storage, and means for manipulation by the operator for testing his skill to adjust the position of the supporting means, the adjusting means including means for predetermining a point in the plane at which the grab element will be effective.

39. In an amusement device for testing the skill of an operator; a storage for a mass of bulk material; and a grab device, the grab device including a grab element, means for supporting the grab element, the supporting means, when the amusement device is not in operation, being adjustable to position the grab element in substantially any plane transversely of the storage, means for manipulation by the operator for testing his skill to adjust the position of the supporting means, and means for predetermining a point in the plane at which the grab element will be effective.

40. In an amusement device for testing the skill of an operator; a storage for a mass of bulk material; and a grab device, the grab device including a grab element, means for supporting the grab element, the supporting means, when the amusement device is not in operation, being adjustable to position the grab element in substantially any plane transversely of the storage, means for manipulation by the operator for testing his skill to adjust the position of the supporting means, and means operated simultaneously with the adjusting means for predetermining a point in the plane at which the grab element will be effective.

41. In an amusement device for testing the skill of an operator; a storage for a mass of bulk material; and a grab device, the grab device including a grab element, means for supporting the grab element, the supporting means, when the amusement device is not in operation, being adjustable to position the grab element in substantially any plane transversely of the storage, means for manipulation by the operator for testing his skill to adjust the position of the supporting means, and means cooperating with the adjusting means for predetermining a point in the plane at which the grab element will be effective.

42. In an amusement device for testing the skill of an operator; a storage for a mass of bulk material; a charge-receiving member at one side of the storage; and a digging device for manipulation by the operator to test his skill, the device including a grab element, a boom for positioning the grab element, the boom being mounted at the side of the storage at which the charge-receiving member is located so that the charge-receiving member is positioned between the storage and the boom mounting, the boom mounting being constructed to swing the grab element within a plane from its point of interaction with the mass of material to a position over the charge-receiving member, and means for manipulation by the operator to determine within that plane of movement a position in the mass of bulk material at which the grab element may be effective.

43. In an amusement device for testing the skill of an operator; a storage for a mass of bulk material; a charge-receiving member at one side of the storage; and a digging device for manipulation by the operator to test his skill, the device including a grab element, a boom for positioning the grab element, the boom being mounted at the side of the storage at which the charge-receiving member is located so that the charge-receiving member is positioned between the storage and the boom mounting, the boom mounting being constructed to swing the grab element within a plane from its point of interaction with the mass of material to a position over the charge-receiving member, the boom also being mounted to change the plane through which the grab element may be moved, and means for manipulation by the operator to determine within that plane of movement a position in the mass of bulk material at which the grab element may be effective.

44. In an amusement device for testing the skill of an operator; a storage for a mass of bulk material; a charge-receiving member at one side of the storage; a digging device for manipulation by the operator to test his skill, the device including a grab element, a boom for positioning the grab element, the boom being mounted at the side of the storage at which the charge-receiving member is located so that the charge-receiving member is positioned between the storage and the boom mounting, the boom mounting being constructed to swing the grab element within a plane from its point of interaction with the mass of material to a position over the charge-receiving member, the boom also being mounted to change the plane through which the grab element may be moved, and means for manipulation by the operator to determine within that plane of movement a position in the mass of bulk material at which the grab element may be effective; and means for guiding material from the grab element to the charge-receiving member.

45. In an amusement device for testing the skill of an operator; a storage for a mass of bulk material; a charge-receiving member at one side of the storage; a digging device for manipulation by the operator to test his skill, the device including a grab element, and a boom for positioning the grab element, the boom being mounted at the side of the storage at which the charge-receiving member is located so that the charge-receiving member is positioned between the storage and the boom mounting, the boom mounting being constructed to swing the grab element within a plane from its point of interaction with the mass of material to a position over the charge-receiving member, the boom also being mounted to change the plane through which the grab element may be moved; and means for guiding material from the grab element to the charge-receiving member.

46. In an amusement device for testing the skill of an operator; a storage for a mass of bulk material; a charge-receiving member at one side of the storage; and a digging device for manipulation by the operator to test his skill, the device including a grab element, a boom for positioning the grab element, the boom being mounted at the side of the storage at which the charge-receiving member is located so that the charge-receiving member is positioned between the storage and the boom mounting, the boom mounting being constructed to swing the grab element within a plane from its point of interaction with the mass of material to a position over the charge-receiving member, the boom also being mounted to change the plane through which the grab element may be moved, and means carried by the boom for guiding material from the grab element to the charge-receiving member.

47. In an amusement device for testing the skill of an operator; a storage for a mass of bulk material; a charge-receiving member at one side of the storage; and a digging device for manipulation by the operator to test his skill, the device including a grab element, a boom for positioning the grab element, the boom being mounted at the side of the storage at which the charge-receiving member is located so that the charge-receiving member is positioned between the storage and the boom mounting, the boom mounting being constructed to swing the grab element within a plane from its point of interaction with the mass of material to a position over the charge-receiving member, the boom also being mounted to change the plane through which the grab element may be moved, and means carried by the boom and extending over the charge-receiving member for guiding material from the grab element to the charge-receiving member.

48. In an amusement device for testing the skill of an operator; a storage for a mass of bulk material; and a digging device for manipulation by the operator to test his skill, the device including a grab element, a boom for positioning the grab element, and means for manipulation by the operator to make the boom effective for determining a position in the mass of bulk material at which the grab element may be made effective, the digging device being constructed to move the boom substantially within a single plane in its movement after the grab element has separated a charge to the position at which the separated charge is released, the position-determining means including means for stopping movement of the boom within the plane of movement.

49. In an amusement device for testing the skill of an operator; a storage for a mass of bulk material; and a digging device for manipulation by the operator to test his skill, the device including a grab element, a boom for positioning the grab element, and means for manipulation by the operator to make the boom effective for determining a position in the mass of bulk material at which the grab element may be made effective, the digging device being constructed to move the boom substantially within a single plane in its movement after the grab element has separated a charge to the position at which the separated charge is released, the position-determining means including adjustable means for stopping movement of the boom within the plane of movement.

50. In an amusement device for testing the skill of an operator; a storage for a mass of bulk material; and a digging device for manipulation by the operator to test his skill, the device including a grab element, a boom for positioning the grab element, and means for manipulation by the operator to make the boom effective for determining a position in the mass of bulk material at which the grab element may be made effective, the digging device being constructed to move the boom substantially within a single plane in its movement after the grab element has separated a charge to the position at which the separated charge is released, the position-determining means including adjustable means for predetermining positions within the plane of movement of the boom at which it will be stopped.

51. In an amusement device for testing the skill of an operator; a storage for a mass of bulk material; and a digging device for manipulation by the operator to test his skill, the device including a grab element, a boom for positioning the grab element, the boom being mounted to be brought selectively into position for movement through any one of a plurality of substantially vertical planes, means for moving the boom on the mounting, and means for manipulation by the operator to make the boom effective for determining a position in the mass of bulk material at which the grab element may be made effective, the digging device being constructed to move the boom substantially within a single plane in its movement after the grab element has separated a charge to the position at which the separated charge is released, the position-determining means including adjustable means for predetermining positions within the plane of movement of the boom at which it will be stopped, said predetermining means cooperating with the means moving the boom on the mounting.

52. The combination with a bulk-dispensing apparatus in which the bulk material is picked up from a storage mass by a grab device and then conveyed to a discharge outlet at which the charge of material is discharged, of a chute communicating with the outlet, a guard valve closing the bottom end of the chute, and a movable false bottom for the chute, the false bottom being vibrated when the valve is pivoted to open position for discharging material from the chute.

53. The combination with a bulk-dispensing apparatus in which the bulk material is picked up from a storage mass by a grab device and then conveyed to a discharge outlet at which the charge of material is discharged, of a chute communicating with the outlet, a pivoted guard valve closing the bottom end of the chute, and a movable false bottom for the chute, the false bottom being vibrated when the valve is pivoted to open position for discharging material from the chute.

54. The combination with a bulk-dispensing apparatus in which the bulk material is picked up from a storage mass by a grab device and then conveyed to a discharge outlet at which the charge of material is discharged, of a chute communicating with the outlet, a pivoted guard valve closing the bottom end of the chute, and a movable false bottom for the chute, the false bottom being vibrated when the valve is pivoted to open position for discharging material from the chute and being moved into position to bar access to the interior of the apparatus when the valve is in open position.

WILLIAM RABKIN.